June 20, 1967 L. W. HERCHENROEDER 3,327,125
WORKPIECE MEASUREMENT APPARATUS USING CLOCK PULSES
Filed March 23, 1964 3 Sheets-Sheet 1

WITNESSES:
John L. Chopp
James F. Young

INVENTOR
Louis W. Herchenroeder
BY R. G. Brodahl
ATTORNEY

United States Patent Office 3,327,125
Patented June 20, 1967

3,327,125
WORKPIECE MEASUREMENT APPARATUS USING CLOCK PULSES
Louis W. Herchenroeder, Penn Hills, Pa., assignor to Westinghouse Electric Corporation, Pittsburgh, Pa., a corporation of Pennsylvania
Filed Mar. 23, 1964, Ser. No. 353,677
6 Claims. (Cl. 250—233)

The present invention relates in general to workpiece measurment apparatus, and more particularly to apparatus for measuring at least one dimension of a workpiece in response to radiant energy from that workpiece.

It has been known in the prior art to measure a projected dimension image of a workpiece from a predetermined remote distance by a suitable and continuous scanning device, such that the length of scan travel can provide an output signal proportional to the measured dimension. This has already been done by the provision of an infrared dimension measuring device utilizing the self-radiation of a heated workpiece, such as a hot slab passing through a rolling mill, to project an image of the slab or sheet dimension at the surface of the scanning device.

If the workpiece is moving, the accuracy of the measurement will depend upon the speed of the scan which requires a finite time interval as well as the speed of motion of the workpiece. At particularly the edge of the workpiece surface dimension to be measured, such as the width dimension of a hot steel sheet, there is a noticeable difference in the infrared radiation to begin the integration of the length of travel of the scanning apparatus transverse to and across the workpiece surface dimension or a projected image of the same to result in an output signal having a proportionality relationship to the measurement of the workpiece dimension scanned.

It is an object of the present invention to provide an improved workpiece measuring device which more accurately determines the edges of a workpiece to measure better a desired dimension of the workpiece and is substantially less affected by non-uniform radiation from the workpiece.

It is a different object to provide improved workpiece measuring apparatus which is better responsive to radiation energy from the workpiece and provides better response to a workpiece having portions providing minimal and perhaps no radiation to be scanned by said apparatus.

In accordance with the teachings of the present invention, a non-contacting workpiece dimension measuring device is provided making use of self-radiation or other suitable radiant energy from the workpiece to project an image of the desired workpiece dimension to be measured onto a surface of a suitable scanning device. This scanning device may comprise an opaque rotating mask member positioned between the projected image of the workpiece and a radiation detector. The operation of the scanning device in effect divides into segments the projected image of the workpiece dimension to be measured, and desired information about each segment can be handled separately and sequentially. A first set of holes or radiation energy scanning passages are provided in the opaque rotating mask member so that the holes pass or scan across the workpiece dimension image in a path generally perpendicular to the dimension being measured, thus successively exposing and then isolating the radiation detector from the workpiece image. Either one of a single scan or a double and interweaved scan can be provided, with each scan traveling from an outer edge of the workpiece dimension in a direction toward the center. A radiation detector generates sequential control signals comprising an electrical signal each time an alternate segment or elemental length of the workpiece is scanned, while those passages which do not scan the workpiece and are beyond the workpiece dimension to be measured will not produce a signal.

Suitable clock pulses can be provided by a second set of light passage holes or magnetic sections if desired to generate a clock pulse for each occurrence of any scanning passage being coincident with the projected image of the workpiece dimension to be measured. The number of clock pulses that are provided concurrent with one or more electrical signals provided by respective exposures of the radiation detector through the scanning passages can be counted to provide a measure of the projected image of the workpiece dimension. The resolution of the measurement is an inverse function of the predetermined length of the holes or passages in the direction of the strip dimension being measured. The workpiece dimension can be satisfactorily determined in this manner.

These and other objects and advantages of the present invention will become apparent in view of the following description taken in conjunction with the drawings, wherein:

FIG. 2 is a schematic side view of the workpiece and the resulting projected image operative with the two mask members and the radiation detector;

Figure 4:
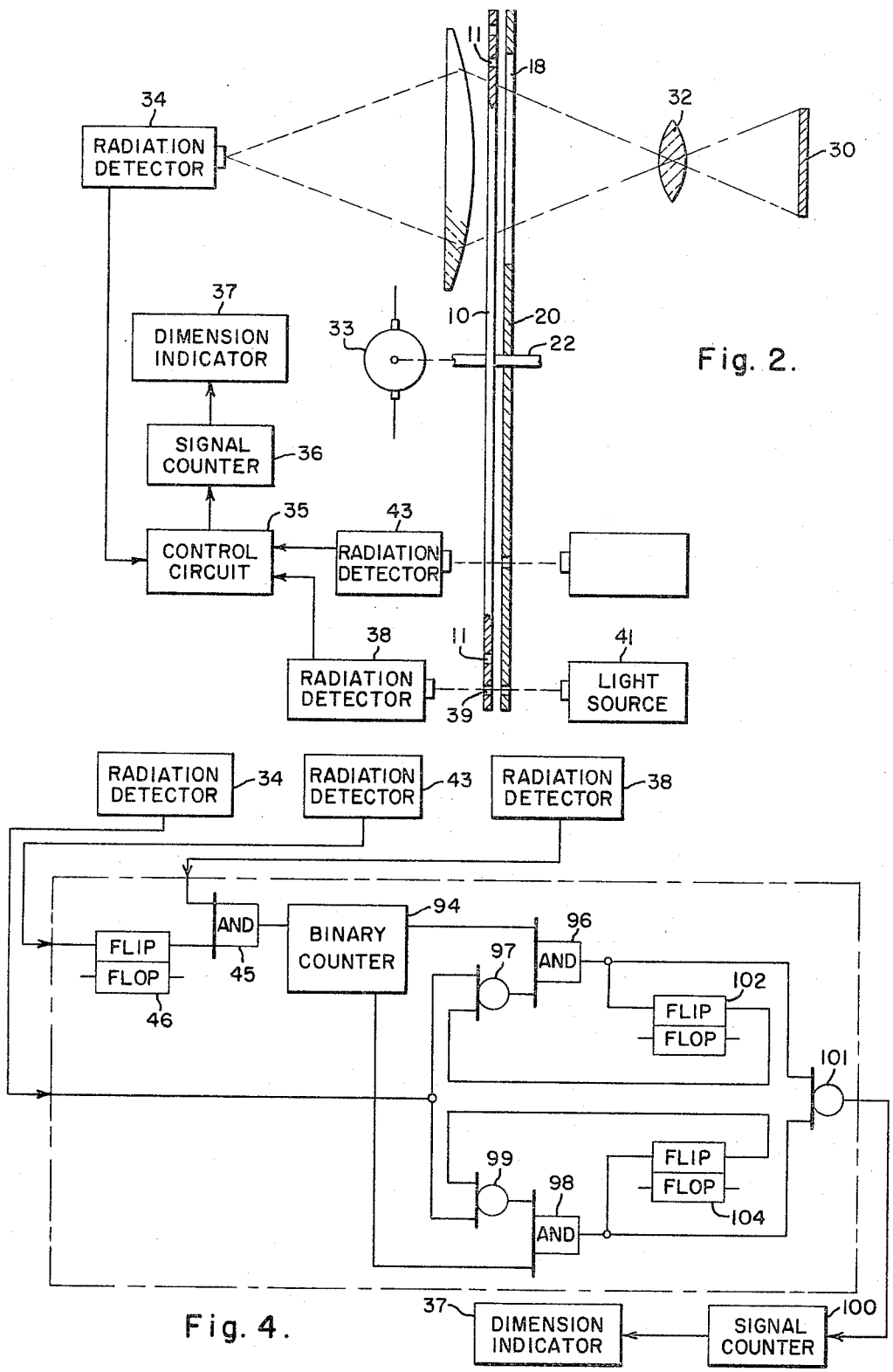
Figure 5:
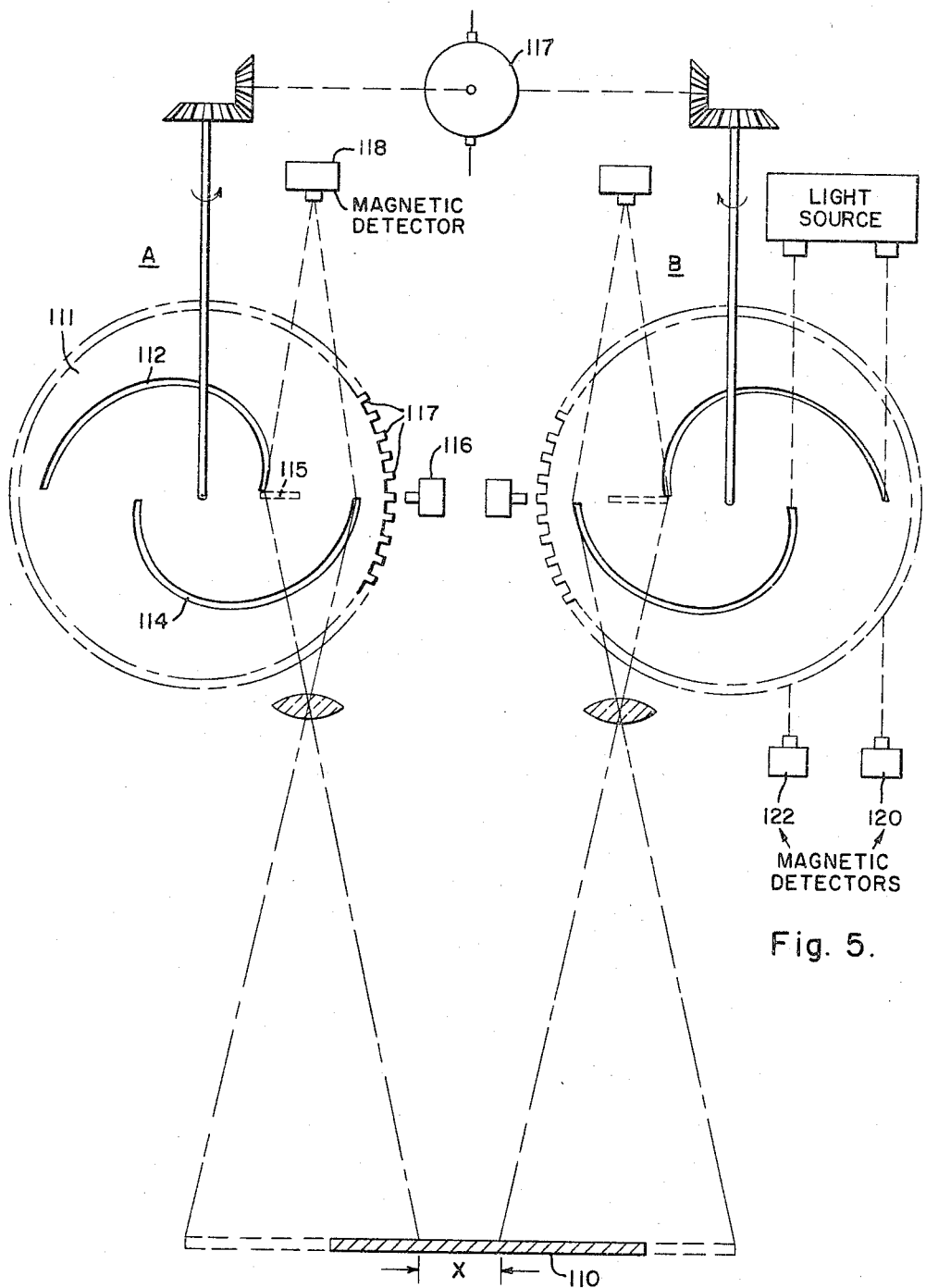

In FIG. 4 there is diagrammatically shown a suitable control circuit for use with the workpiece measurement apparatus shown in FIG. 2; and In FIG. 5 there is shown another modification of the present workpiece measurement apparatus.

Figure 1:
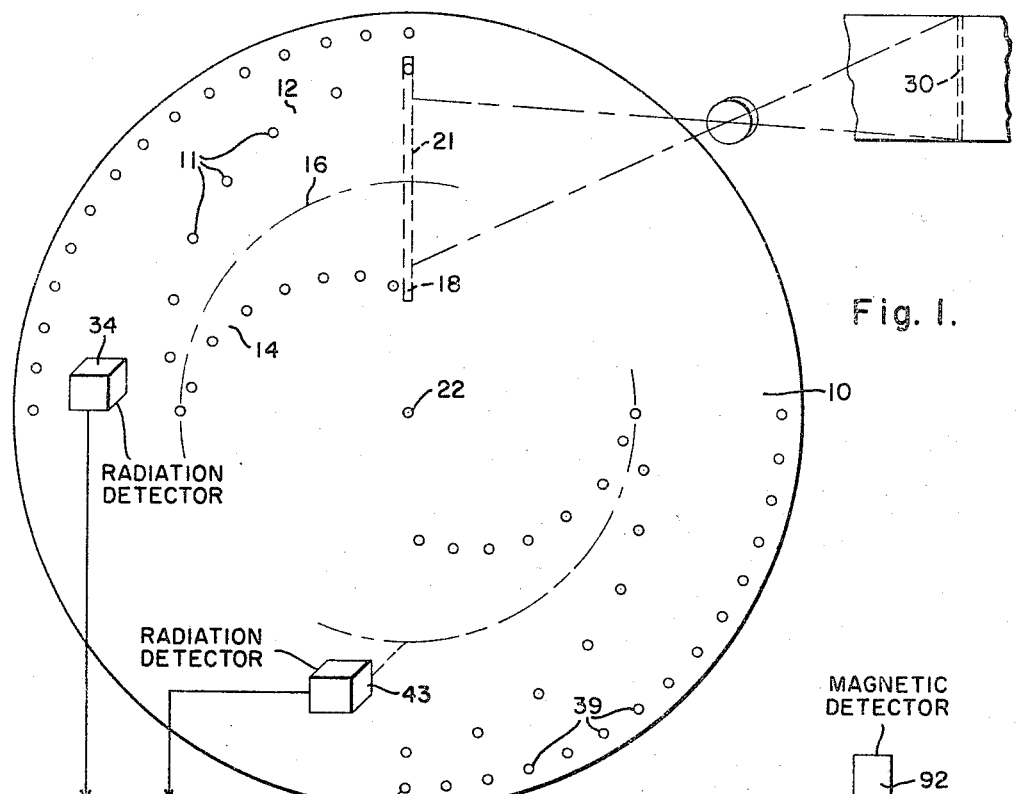
FIGURE 1 is an illustration of the present workpiece measurement apparatus including a rotating mask member operative with a stationary mask member and relative to the projected image of the workpiece dimension to be measured.

In FIG. 1 there is shown a first rotatable mask member 10 having a plurality of scanning holes or passages 11 arranged respectively in a first spiral path 12 and in a second spiral path 14 relative to the centerline 16 of an opening 18 in a stationary mask member. The first mask member 10 is rotatable about an axis 22, whereas the second mask member is stationary in position relative to the axis 22. A projected workpiece image 21 is sequentially exposed along its whole length relative to a first energy detector 34 operative through a control circuit 35 with a signal counter 36. A second energy detector 38 is operative to receive light energy from a suitable light source through provided clock pulse holes 39 located around the periphery of the rotatable mask member 10 and respectively corresponding to the radial position of a corresponding and cooperative scanning hole or passage 11, such that successive clock pulses are supplied by the second energy detector 38 through the control circuit 35 to the signal counter 36 for each sequential exposure of the workpiece image 21 through the scanning holes 11. A dimension indicator 37 is operative to provide a suitable output indication of the measured dimension.

In FIG. 2 there is shown a side view of the first mask member 10 and the second mask member 20 relative to the axis 22, with the opening 18 in the second mask member 20 being shown. A workpiece dimension 30 to be measured has its image projected through a lens system 32 and through the opening 18 in the second and stationary mask member 20 onto the plane of the first mask member 10, as illustrated in FIG. 2. As the mask member 10 is rotated by the motor 33 and the plurality of holes 11 provided in the first spiral path and in the second spiral path are sequentially aligned with the provided passage 18 in the stationary mask member 20, radiant energy from the workpiece 30 and passing through the lens system 32 energizes the radiation detector 34. In this respect, the radiation detector 34 may be an infrared or hot metal detector device operative with the self-radiation from the heated workpiece 30, which might be a hot slab or sheet of metal to be measured in co-operation with a rolling mill or the like. A provided light source 41 energizes the energy detector 38 through each of the holes 39 to provide successive clock pulses through the control circuit 35 to the signal counter 36 and corresponding to the rotation of the first mask member 10.

The first control signal provided by the detector 34 resulting from energization through a hole 11 within the spiral path 12 causes the signal counter 36 to begin counting all of the odd clock pulses thereafter received from the detector 38 until the end of the particular image scanning operation taking place. Similarly, the first control signal provided by the detector 34 resulting from energization through a hole within the spiral path 14 causes the signal counter 36 to begin counting all of the even clock pulses thereafter received from the detector 38 until the end of the particular image scanning operation taking place. The clock pulses supplied to the signal counter 36 are totaled to operate a suitable dimension indicator 37. A suitable pulse providing device such as radiation detector 43 can be operative and is positioned to correlate the rotation of the mask member 10 with the counting operation of counter 36 by sensing the passage of the hole 11 located on the centerline 16 for each scanning operation by the mask member 10.

Figure 3:
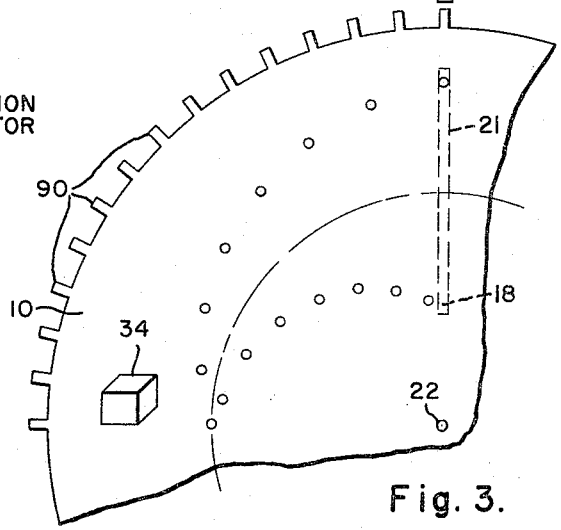
FIG. 3 is an illustration of a modification of the rotating mask member shown in FIG. 1.

In FIG. 3, there is shown a modification of the rotating mask member 10 for measuring the dimension of a workpiece. A plurality of magnetic metal teeth 90 on the periphery of the mask member 10 are operative with a magnetic position sensing device 92 to generate successive clock pulses correlated with the operation of and as a function of the rotation of the mask member 10. Note that each tooth 90 corresponds in radial position with one of the scanning holes or passages 11, such that a clock pulse will be obtained for each hole that scans the projected image 21 of the workpiece dimension to be measured.

In FIG. 4 there is shown a suitable control circuit for counting the clock pulses from the detector 38 as initiated and controlled by the control signals from the detector 34. Since the outer spiral 12 of holes provides odd pulses and is used to detect the beginning of one edge of the workpiece and the inner spiral 14 of holes provides even pulses and is operative to detect the beginning of the opposite edge of the workpiece, it is necessary to distinguish between those clock pulses that are to be counted and those that are associated with the respective workpiece edges since one edge of the workpiece may be detected several control signals prior to the other or opposite edge. As shown in FIG. 4, a clock pulse from the detector 38 is fed through a suitable AND gate 45 to a single stage binary counter 94 for each of the alternate odd and even scan holes 11. Each odd clock pulse is assigned to the outer spiral 12 and each even clock pulse is assigned to the inner spiral 14. The odd clock pulses are supplied by the binary counter 94 to a first input of a conventional AND logic device 96. The even clock pulses are supplied by the binary counter 94 to a first input of a conventional AND logic device 98. The control signals from the image detector 34 are supplied through respective OR devices 97 and 99 to the second input of each of AND logic device 96 and AND logic device 98. When radiation passing through a hole in outer spiral 12 first energizes the detector 34, a control signal is supplied concurrent with a clock pulse from the detector 38 to the AND device 96 to supply a count pulse from the AND logic device 96 through the OR device 101 to the signal counter 100. This count pulse switches the flip-flop memory device 102 to continuously energize the second input of AND logic device 96 such that each successive odd clock pulse from the detector 38 due to energization through a hole 39 will supply a count pulse to the signal counter 100. Similarly, when radiation passing through a hole in the inner spiral 14 first energizes the detector 34, a control signal is supplied concurrent with a clock pulse from detector 38 to the AND device 98 to supply a count pulse from the AND logic device 98 through the OR device 101 to the signal counter 100. The latter count pulse switches the flip-flop memory device 104 to continuously energize the second input of AND logic device 98 such that each successive clock pulse from the detector 38 due to energization through a hole 39 will supply a count pulse to the signal counter 100. When the pulse device or radiation detector 43 senses the occurrence of the hole 11 located on the centerline 16 and thus the end of this particular scanning operation, a pulse is supplied through flip-flop 46 to open the gate 45 and prevent additional clock pulses being applied to the binary counter 94 and thereby to terminate the supply of count pulses to the width counter 100. The dimension indicator 37 can now read the correct measured dimension of the workpiece 30.

In FIG. 5 there is shown a modification of the present measurement apparatus wherein dimension measurement devices A and B are each operative to measure the opposite edge positions of the workpiece 110 with a known central spacing X being predetermined between the respective scanning areas. No such spacing need be provided between the respective scan movements if desired. Each measurement device A or B is generally similar to the other, so only measurement device A will be here described in detail. A rotatable mask member 111 is provided with a spiral slot 112 and a spiral slot 114 so positioned as to successively scan the projected image 115 of the workpiece dimension to be measured. Around the periphery of the rotatable mask member 111 are provided variable reluctance sections, such as milled magnetic material teeth 117, operative with a position sensing device 116 to supply clock pulses coordinated with the scanning rotation of the mask member 111. A radiation detector 118 is energized by infrared energy passing through either of the spiral slots 112 and 114.

The measurement devices A and B are coupled through motor 117 and coordinated in operation to provide simultaneous scans of the respective workpiece edges. A scan start sensing device 120 and a scan stop sensing device 122 are provided to determine the period during which the clock pulses from the position sensing device 116 will be counted for a particular workpiece measurement operation.

In an embodiment of the measurement apparatus as shown in FIG. 5 that was actually built and tested, a workpiece 110 having a temperature between 1500° F. to 2200° F. and a maximum dimension to be measured of 730 cm. was satisfactorily measured having a resolution of ±1 cm. at a scanning speed of 50 scans per second. On hot strip measurement applications, this apparatus as shown in FIG. 5 will measure widths up to 82 inches with a 0.1 inch resolution. If desired total width readings can be transferred to a memory readout when a reading is required for every scan, although it might be preferred to provide a readout for the average of several measurements such as from two to ten dimension measuring scan operations. This readout can readily be any one of visual, a printed record or the data can be fed into a computer.

The apparatus shown in FIGS. 1 and 2 comprises an opaque and rotating mask member 10 placed between the image 21 of the hot workpiece 30 and a radiation detector 34. The spirally arranged holes 11 in the mask member 10 are operative such that they successively pass across the workpiece image 21 in a path substantially perpendicular to the workpiece dimension corresponding to the width of the image 21, and which is being measured, to alternately expose and isolate the detector 34 from the radiation energy of the heated workpiece 30. A control signal will be generated by the detector 34 each time a segment of the workpiece image 21 is scanned, while those holes 11 which scan beyond the dimension of the workpiece image 21 will not produce such an electrical control signal. There is radially positioned in the opposite quadrant of the mask member 10 and relative to each hole 11, a clock pulse generating hole 39 located at the periphery of the mask member 10 and operative with the light source 41 and detector 38 to concurrently generate a clock pulse for each potential control signal. The number of exposures of the detector 34 through the respective holes 11 will be a measure of the length of the workpiece dimension to be measured and it is only necessary to count the concurrent clock pulses generated by the detector 38, knowing in advance the provided spacing between the scans across the workpiece image 21 by the respective holes 11 provided in the mask member 10, to determine the actual projected dimension of the workpiece 30.

The resolution of such measurement will be an inverse function of the width of the holes in the direction of the workpiece dimension being measured. If the workpiece 30 is stationary, the measurement should be substantially independent of the rotating speed of the scanning mask member 10.

It is within the scope of this invention to provide the holes 11 for only a limited range of workpiece dimension variation. In other words, if the workpiece edges vary in position through a range of only six inches at either side, then only a partial scanning spiral of holes 11 need be provided for each of the first spiral path 12 and the second spiral path 14 to correspond to this range of variation without continuing the scan through the remaining interior portion of the scanned dimension to simplify the necessary scanning operation or to reduce the time required to effect the desired measurement. The control signals provided by the holes 11 are employed to initiate the counting of the clock pulses whenever the edge of the workpiece is detected. An end of scan sensing pulse can be provided as previously described.

Also, the sensed energy can be reflected light energy or the like from a moving paper strip or back lighting to detect a workpiece edge if desired, with a photocell being used to detect the light energy so received. Also fiber optic techniques can be used here if desired.

The invention described herein is related to the invention covered in copending patent application now issued as U.S. Patent No. 3,254,226, entitled Workpiece Measurement Apparatus and assigned to the same assignee.

Although the present invention has been described with a certain degree of particularity, it should be understood that the present disclosure has been made only by way of example and that numerous changes in the details of construction and the combination and arrangement of parts may be resorted to without departing from the scope and spirit of the present invention.

I claim as my invention:

1. In a device for measuring a workpiece dimension having an edge, the combination of image providing means operative with said workpiece for providing an image of said workpiece dimension, scanning means sequentially operative to scan along said workpiece dimension image to provide a first control signal upon the sensing of said edge, and signal providing means cooperative with said scanning means to provide a plurality of second control signals correlated to said sequential scan, and dimension measuring means responsive to said first control signal for permitting said provided second control signals to measure said workpiece dimension.

2. In apparatus for measuring a dimension of a workpiece having an edge and responsive to radiant energy from said worpiece, the combination of radiant energy sensing means responsive to radiant energy from said workpiece for providing a first control signal, dimension scanning means operative with said radiant energy sensing means to scan across said workpiece dimension in predetermined increments such that at least one control signal is provided for the exposure of the radiant energy sensing means to radiant energy from said edge, increment sensing means responsive to said first control signal and to the scanning of said workpiece dimension for providing at least one second signal indicative of said workpiece dimension, and output means responsive to at least one second signal for giving a measurement of the workpiece dimension.

3. In a device for measuring a workpiece dimension having an edge, the combination of image projecting means operative with said workpiece for providing a radiation energy image of said workpiece dimension to be measured, scanning means operative with said image for sensing the position of said workpiece dimension edge and providing an output first signal when said edge is sensed, pulse providing means operative with said scanning means for providing a plurality of second signal pulses in accordance with a predetermined length of said dimension that is scanned after the occurrence of said output first signal, and cooperative with each successive exposure of the radiation energy image sensed by said scanning means, and signal counting means responsive to the pulses provided during the scan along said predetermined length of said dimension after said output first signal has occurred.

4. In a device for measuring the length of a predetermined dimension of a workpiece which emits radiation energy, the combination of radiation image means operative with said workpiece for providing an image of said workpiece dimension, scanning means having a first plurality of radiation energy passages positioned to scan a predetermined portion of said workpiece dimension image for providing at least one first output signal in response to radiation energy from said workpiece, signal providing means having a second plurality of signal providing means cooperative with said scanning means such that sequential second output signals are provided by the signal providing means in correspondence with the operation of said scanning means, length indication means responsive to said second output signals for providing an indication of the length of said dimension and end of scan operation sensing means cooperative with said scanning means for providing a control signal to terminate the operation of said length indication means at the end of each desired scan operation.

5. In apparatus for measuring a predetermined dimension of a workpeice in response to radiant energy from said workpeice, the combination of first signal providing means responsive to said workpeice radiant energy for providing an electrical control signal, energy masking means having at least one radiant energy passage positioned to scan a predetermined length of said workpeice dimension to be measured and permitting the passage of said radiant energy for the whole of said predetermined length, scan movement sensing means operative with said masking means and responsive to said electrical control signal to provide an indication of the length of said scan, said energy masking means being positioned between the signal providing means and the workpiece such that said electrical control signal is initiated at the commencement of the exposure of the signal providing means to said workpiece radiant energy through said passage.

6. In apparatus for measuring at least one dimension of a workpiece having a first edge and a second edge in response to radiant energy from said workpiece, the combination of first signal providing means responsive to radiant energy from said workpiece for providing an electrical signal, mask means having at least one opening operative with each of said edges and operative to scan along said workpiece dimension and to permit the passage of said radiant energy from each of said edges, second signal providing means responsive to said scan operation along said workpiece dimension, said mask means being positioned between said first signal providing means and the workpiece such that an electrical signal is provided for the response of the first signal providing means to the workpiece radiant energy from each of said edges through said opening, said second signal providing means being responsive to each said first electrical signal for determining said workpiece dimension.

References Cited

UNITED STATES PATENTS

| | | | |
|---|---|---|---|
| 2,941,086 | 6/1960 | Gottschall et al. | 250—219 |
| 3,003,064 | 10/1961 | Astheimer | 250—233 |
| 3,146,350 | 8/1964 | Topfer | 250—219 |
| 3,254,226 | 5/1966 | Bobula et al. | 250—233 |

RALPH G. NILSON, *Primary Examiner.*

WALTER STOLWEIN, *Examiner.*

M. ABRAMSON, *Assistant Examiner.*